United States Patent
Robustelli et al.

(10) Patent No.: US 12,349,032 B2
(45) Date of Patent: Jul. 1, 2025

(54) METHOD OF NEAR FIELD COMMUNICATION CONTROL BASED ON COMMUNICATION TIME

(71) Applicant: ZEBRA TECHNOLOGIES CORPORATION, Lincolnshire, IL (US)

(72) Inventors: Michael Robustelli, Smithtown, NY (US); Joseph Cabana, Centereach, NY (US); Marek Trusinski, Kings Park, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 259 days.

(21) Appl. No.: 17/900,743

(22) Filed: Aug. 31, 2022

(65) Prior Publication Data

US 2024/0073664 A1 Feb. 29, 2024

(51) Int. Cl.
*H04W 4/80* (2018.01)
*H04B 5/77* (2024.01)

(52) U.S. Cl.
CPC ............... *H04W 4/80* (2018.02); *H04B 5/77* (2024.01)

(58) Field of Classification Search
CPC ..................................................... H04W 4/80
See application file for complete search history.

(56) References Cited

U.S. PATENT DOCUMENTS

| | | | |
|---|---|---|---|
| 11,049,074 B1* | 6/2021 | Eby | G06F 16/29 |
| 11,696,351 B2* | 7/2023 | Manthrayil Sachidanandan | H04W 84/18 370/329 |
| 2018/0343024 A1* | 11/2018 | Sahebjavaher | H04M 1/0202 |
| 2020/0210604 A1* | 7/2020 | Graf | H04W 12/06 |
| 2020/0382912 A1* | 12/2020 | Dancie | H04W 4/14 |
| 2021/0058758 A1* | 2/2021 | Carter | H04W 4/80 |
| 2021/0274315 A1* | 9/2021 | Daoura | H04W 4/38 |
| 2022/0233382 A1* | 7/2022 | Williams | G16H 40/20 |

FOREIGN PATENT DOCUMENTS

WO WO-2023079506 A1 * 5/2023 ........ H04W 56/0015

* cited by examiner

*Primary Examiner* — David Bilodeau (57) ABSTRACT

In some implementations, a computer system may initiate a method comprising: the method comprising: initiating communication between a tag and a reader; initiating a first program; determining a communication time period by starting a timer when the tag and the reader are within a communication range and stopping the timer when the tag and the reader are no longer within the communication range; comparing the communication time period to a first threshold time period; and when the communication time is greater than the first threshold time period, initiating a second program different from the first program.

13 Claims, 5 Drawing Sheets

METHOD OF NEAR FIELD COMMUNICATION CONTROL BASED ON COMMUNICATION TIME

BACKGROUND

Near Field Communication (NFC) tags and NFC readers may be capable of different types of data transfer and communication. For example, NFC communication can be used for accessing computing systems and initiating programming within the computer system.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

DETAILED DESCRIPTION

The following detailed description of example implementations refers to the accompanying drawings. The same reference numbers in different drawings may identify the same or similar elements.

A system using NFC communications to allow access to the system may include an NFC reader to actively generate a RF field that powers a passive target (e.g. NFC tag) within the NFC reader's proximity. When the NFC tag enters the NFC reader's proximity, the RF field of the NFC reader energizes the NFC tag an antenna within the NFC tag to access a system, a NFC reader associated with the system detects the NFC tag when the NFC tag is in proximity of the NFC reader. Embodiments of the present invention allow for other types of interaction between the NFC tag and the NFC reader, wherein the period of interaction between the tag and the reader may initiate different programs.

Examples disclosed herein are directed to a method for initiating an action with a computer system, the method comprising: initiating communication between a tag and a reader; initiating a first program; determining a communication time period by starting a timer when the tag and the reader are within a communication range and stopping the timer when the tag and the reader are no longer within the communication range; comparing the communication time period to a first threshold time period; and when the communication time is greater than the first threshold time period, initiating a second action different from the first action.

Other examples disclosed herein are directed to a system comprising: a reader; and a computing system comprising memory and a processor, wherein the processor is configured to: detecting, via a reader, a tag entering a communication region; starting a communication timer representative of a communication time period where the tag is in the communication region; initiating a first program when the tag enters the communication region; stopping the communication timer at a communication time period when the tag exits the communication region; comparing the communication time period to a threshold time period; when the communication time period is greater than or equal to a threshold time period, initiating a second program; and when the communication time period is not greater than a third program, initiating a third program difference from the first program.

Other examples disclosed herein are directed to a tangible machine-readable medium comprising machine-readable instructions that, when executed, cause a machine to at least: method for initiating an action via near field communication, the method comprising: initiating communication between a tag and a reader; initiating a first program; determining a communication time period by starting a timer when the tag and the reader are within a communication range and stopping the timer when the tag and the reader are no longer within the communication range; comparing the communication time period to a first threshold time period; and when the communication time is greater than the first threshold time period, initiating a second program different from the first program.

Some implementations described herein enable a user to initiate multiple programs from a communication action. The communication action is variable based on a communication time period in which the NFC tag is in communication range of the NFC reader. When the NFC tag enters communication range with the NFC reader, the action initiates a first program, such as a log-in program to an electronic resource, such as a device, a computer, a network, or the like. In further embodiments, the first program may be a status display of an NFC device, such as battery health or battery charge state. As will be described in further detail below, if the NFC tag is in communication range with the NFC reader for a time period greater than or equal to the first time threshold period, this is characterized as a "hold" action. The hold action initiates a second program. In further embodiments, the second program initiates a battery swap.

The second program initiated may be a workplace specific program. For example, when the first program is a log-in program, the second program initiates an action within the workplace specific program. For example, in a medical facility, a user may approach a computer system and use a first tap against an NFC or RFID reader with an NFC or RFID ID badge to log-in to the system and then continue to hold the badge against the NFC or RFID reader to further initiate a second program such as distributing medicine or accessing patient records.

Figure 1:
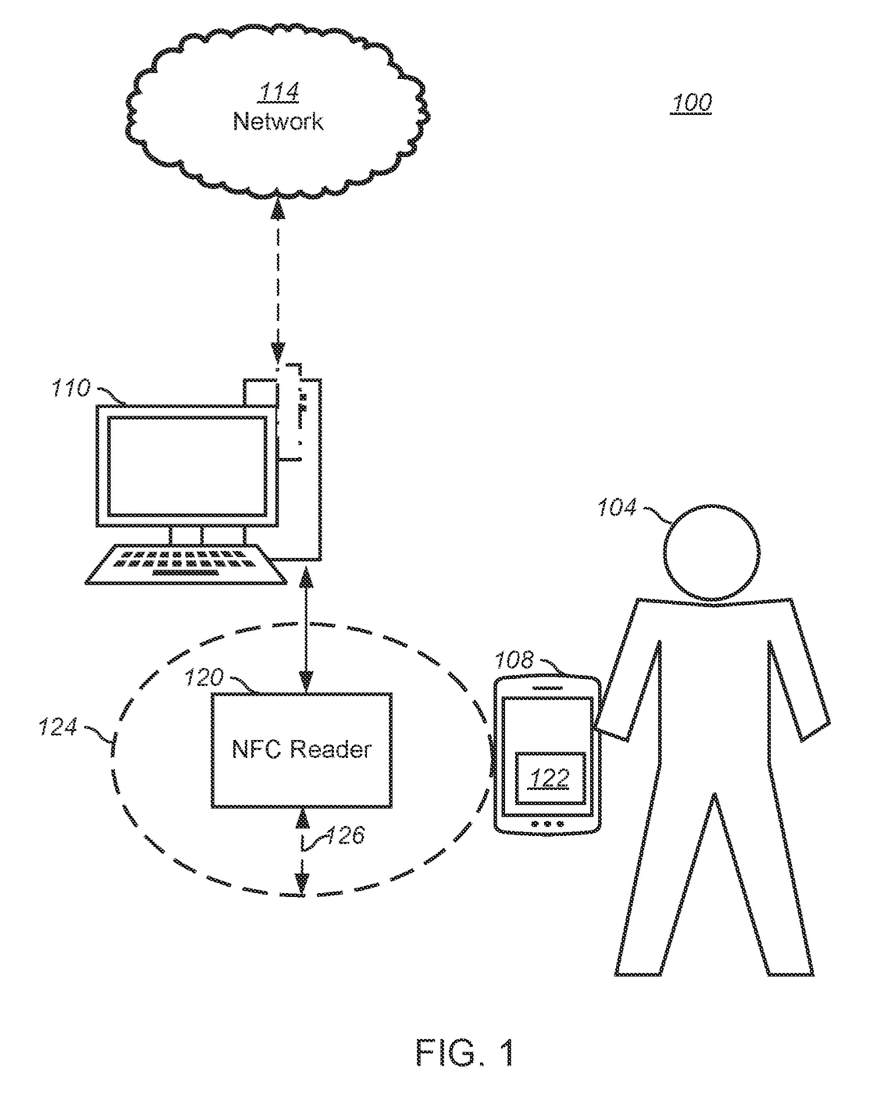
FIG. 1 is a diagram of an example environment in which systems and/or methods described herein may be implemented.

FIG. 1 depicts an example system 100. As further described below, the system 100 is used to initiate programs on a computer system 110. In the illustrated embodiment, the tag 122 and the reader 120 operate in accordance with the NFC communication standard. As those of ordinary skill in the art will realize, the following description generally applies to tags and readers communicating in accordance with short range wireless protocols, including NFC, RFID (Radio Frequency Identification), and the like. The system 100 can be accessed by a user 104 with an NFC tag 122. As depicted in FIG. 1, the NFC tag 122 is used by the user 104 for communicating with computer system 110 via an NFC reader 120. The NFC tag 122 as depicted in FIG. 1 is an element of the mobile computing device 108 (sometimes called an NFC device), however, the NFC tag 122 may be a passive NFC tag or an active NFC tag. In other embodiments, the NFC tag 122 is contained within an identification card, an identification badge, a wearable NFC tag, or any other method known to support an NFC tag. The NFC tag 122 includes an antenna and a chip. The chip of the NFC tag 122 may contain data related to the user 104 such that a scan of the NFC tag 122 recognizes the NFC tag 122 as belonging to the user 104.

As depicted in FIG. 1, the system 100 comprises the NFC reader 120. The NFC reader 120 as depicted in FIG. 1 is in wired connection with the computer system 110. The computer system 110 may also be known as a computer or computing system. In other embodiments the connection is wireless. The NFC reader 120 emits a radio frequency (RF) signal that creates an RF field 124 around the NFC reader 120. The RF field 124 extends a communication range 126 from the NFC reader 120.

As depicted in FIG. 1, the RF field 124 is an area in three-dimensional space around the NFC reader 120 in which the RF signal emitting from the NFC reader 120 extends. The RF field 124 is configured to energize the NFC tag 122 when the NFC tag 122 enters the proximity of the NFC reader 120. The size of the RF field 124 in FIG. 1 is dependent on power of the RF signal, in that more power supplied to the RF signal allows the RF signal to extend to a greater communication range 126.

As depicted in FIG. 1, the communication range 126 is the range in which the RF signal extends from the NFC reader 120 which establishes the size of the RF field 124. It should be noted that as is common for RF signals, the RF signal weakens in direct relation to the range from the NFC reader, as in the RF signal will be stronger closer to the NFC reader and weaker the further out the RF signal extends. The communication range 126 as illustrated in FIG. 1 is the range in which NFC communication effectively occurs. In the described embodiment, the communication range 126 is between 0-10 centimeters. As depicted in FIG. 1, when the NFC tag 122 enters within the communication range 126 to the NFC reader 120, the NFC tag 122 is energized.

The computer 110 is in further communication with a network 114. The network 114 is used for accessing programming via an NFC communication. As illustrated in FIG. 1, an NFC tag 122 (shown in FIG. 1 within a mobile computer 108) is used by a user 104. As the user 104 brings the NFC tag 122 within a communication range 124 to an NFC reader 120, the NFC reader 120 is connected to a computer system 110, the connection may be wired or wireless. In the illustrated embodiment of FIG. 1, the computer system 110 has a communication port 118, wherein the communication port 118 assesses a network 114.

As depicted in FIG. 1, the user 104 brings a device 108 containing NFC tag 122 within communication range of the NFC reader 120. Once the NFC tag and the NFC reader are within communication range and initiate communication, the communication timer starts and the first program initiates. The first program in this scenario is a log-in program, which allows the user to access the computer 110. When the user 104 removes the NFC tag from the NFC reader, the communication time period is compared against a threshold time period. If the communication time period was greater than or equal to the threshold time period, then a second program is initiated, which in the illustrated embodiment is to access the patient records. In another embodiment, when the user 104 brings the device 108 within communication range of the NFC reader 120, a status of the NFC reader 120 is displayed on the computer 110. The status may include a battery health or battery life status of the NFC device.

Figure 2:
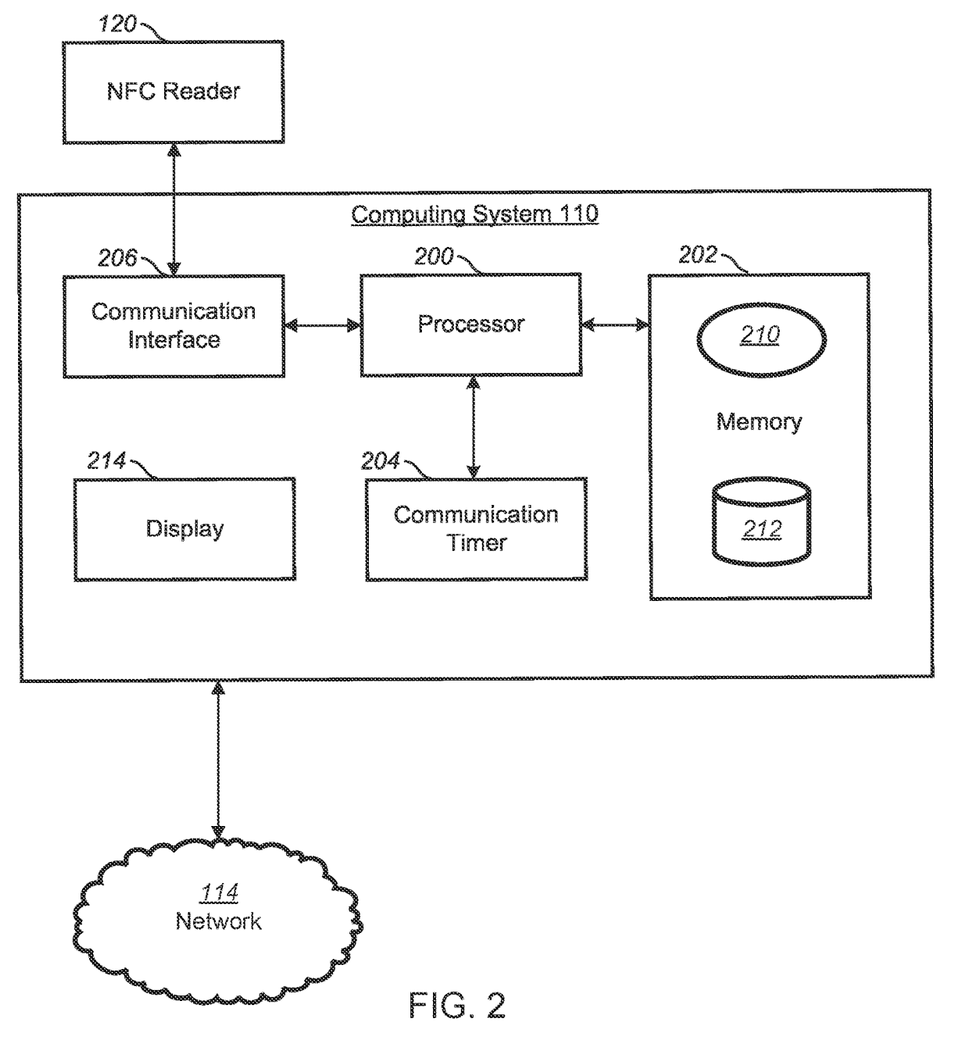
FIG. 2 is a component view of the computing system from FIG. 1.

FIG. 2 depicts internal components of the computing system 110 of FIG. 1. The computing system 110 includes a central processing unit (CPU), also referred to as a processor 200, interconnected with a non-transitory computer readable storage medium, such as a memory 202. The memory 202 includes any suitable combination of volatile (e.g., Random Access Memory (RAM)) and non-volatile (e.g. read only memory (ROM), Electrically Erasable Programmable Read Only Memory (EEPROM), flash) memory. The processor 200 and the memory 202 each comprise one or more integrated circuits (ICs).

The memory 202 stores a plurality of computer-readable instructions 210, e.g., in the form of a log-in application, battery status displaying application, and secondary applications. The applications are executable by the processor 200 to implement various functionality performed by the computing system 110. As will be discussed below, the log-in application implements functionality to allow a user to access a display 214 and to access other internal functions of the computer system 110. The other internal functions of the computer system 110 may include printing, managing additional inputs, managing testing results, viewing protected data, etc. Other embodiments of the computer system 110 includes a computer system 110 to be used in a medical facility for treating patients, wherein the computer system 110 is located in an examination room and a user is a nurse. In this situation, the nurse could initiate the log-in application on the computer system 110 and then access the patient's records, print needed documents, order medicine, prepare medical tests, etc. In the described embodiment, these applications are stored in the memory 202 however in other embodiments, storage may be somewhere else in the network 114.

The memory 202 stores, in this example, a repository 212 of application data. The computing system 110, however, may not be the only source of application data in the system 100. In fact, in some examples, the computing system 110 may not host any staging data.

The computing system 110 also includes at least one input device, illustrated in FIG. 2 as a communication interface 206 (otherwise called user interface) interconnected with the processor 200. In the present example, the NFC reader 120 communicates with the communication interface 206. In the illustrated embodiments, when the NFC reader 120 communicates with the NFC tag 122, data from the NFC tag 122 is transferred to the system via communication interface 206. The data obtained from the NFC tag 122 is associated with the user 104 or the device 108. In some embodiments, the processor uses the data to look up preset first or second programs the user 104 previously selected to initiate when the NFC tag and the NFC reader enter range of each other. Or the data may include instructions for the processor to initiate the first or second program once communication is started between the NFC tag and NFC reader. In another embodiment, the processor processes the data to determine if the user 104 has proper security clearance to access the computer 110. If the processor determines that the user 104 does not have proper security clearance, an alert may be issued. The data from the NFC tag may be compared to tables in the memory of the computer 110 or in the network 114. In additional embodiments, the communication interface 206 is also connected with other types of input devices such as any suitable one, or any suitable combination of, a touch screen, a keypad, a trigger, a microphone and the like.

The computing system 110 of FIG. 2 includes a display 214. The display 214 includes any suitable one, or any suitable combination of a display (e.g., touch screen), a speaker, and the like. The communication interface 206 is configured to receive input and provide data representative of the received input to the processor 200, and to receive output from the processor 200 and present the output, e.g., via the emission of sound from the speaker, the rendering of visual indications on the display, and the like.

The computing system 110 also includes a communication timer 204, enabling the computing system 110 to measure and record a communication time period. As illustrated in FIG. 1, as the NFC tag 122 approaches the communication region of the NFC reader 120, the communication timer 204 starts. As illustrated in FIG. 1, as the NFC tag 112 moves outside of a communication range from the NFC reader 120, the communication timer 204 stops. The amount of time the communication timer 204 stops at is the communication time period. The communication time period is then recorded in the memory 202.

The components of the computing system 110 are interconnected by communication buses, and powered by a battery or other power source, over the above-mentioned communication buses or by distinct power buses. In other examples, the processor 200, as configured by the execution of the application 210, is implemented as one or more specifically configured hardware elements, such as field-programmable gate arrays (FPGAs) and/or application-specific integrated circuits (ASICs).

Figure 3:
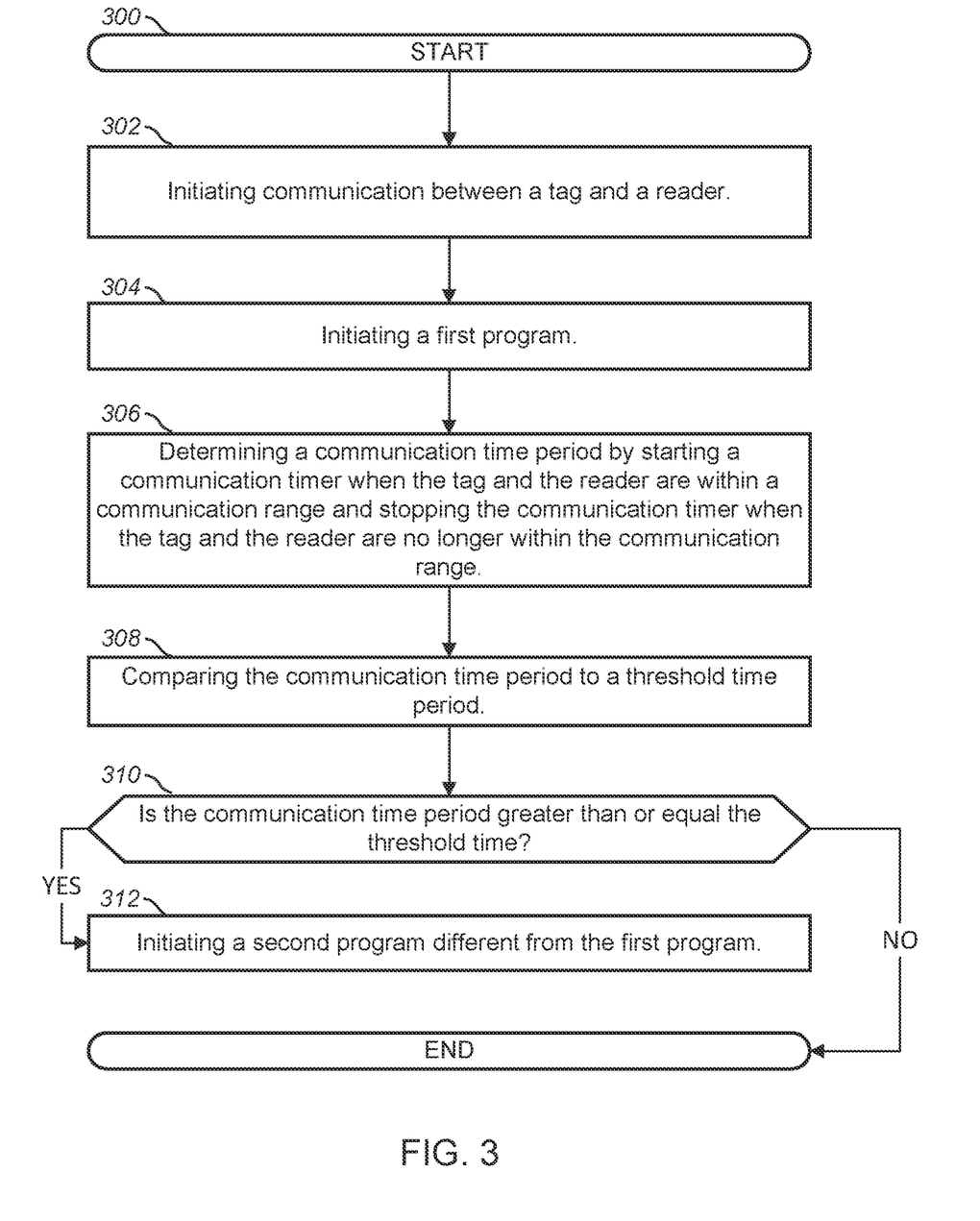
FIG. 3 is a flowchart of an example process using the example system of FIG. 1.

FIG. 3 depicts a flow chart of an example method to complete with the embodiment show in FIG. 1.

As illustrated in FIG. 3, step 302 includes initiating communication between a tag and an reader. As depicted in FIG. 1, the tag 122 and the reader 120 communicate via NFC means and initiating communication is done when the NFC tag 122 enters the communication region 124 of the NFC reader 120. An example of this step includes the NFC tag 122 entering the RF field 124 of the NFC reader 120. In one embodiment, this is shown when a medical professional approaches a computer system in a patients room and touches a NFC device to the NFC reader of the computer system.

As illustrated in FIG. 3, step 304 comprises initiating a first program. Upon communication being initiated, the first program will initiate automatically by the processor of the computer system 110. In the embodiment illustrated in FIG. 1, the first program is a log-in program allowing the user to access the computer system 110. The log-in program is stored in the memory and accessible by the processor 200 after reading data from the tag. The log-in process is any type of process wherein the computing system 110 changes from an inaccessible state to an accessible state wherein a user can access the computing system files or programs.

As illustrated in FIG. 3, step 306 comprises determining a communication time period by starting a communication timer when the NFC tag 122 and the NFC reader 120 are within a communication range and stopping the communication timer when the NFC tag 122 and the NFC reader 120 are no longer within the communication range. In the depicted embodiment, the communication timer 208 is part of the computing system 110. The communication timer 204 measures the amount of time that the NFC tag 122 is within the communication region 124 of the NFC reader 120. This amount of time is referred to as the communication time period.

Then, when the NFC tag 122 and the NFC reader 120 are no longer within communication range and are no longer communicating, the communication timer 204 stops at the communication time period. The greater the communication time, the longer the time that NFC tag 122 and NFC reader 120 were communicating. As illustrated in FIG. 1, considering the user 104 holds the NFC tag 122 (via the mobile computing device 108), the user 104 controls the position of the NFC tag 122 and how long the NFC tag 122 remains within communication range 126 from the NFC reader 120. As will be described further below, the length of the communication time period can initiate different programming within the computer system 110.

As illustrated in FIG. 3, step 308 comprises comparing the communication time period to a threshold time period. The threshold time period for the user is saved in the memory 202. In some embodiments, the threshold time period is configurable and capable of being preset by the user. In the embodiment illustrated in FIG. 1, the threshold time period is 2 seconds.

As illustrated in FIG. 3, step 310 determines if the communication time period is greater than or equal to the threshold time period.

In response to the communication time period being greater than or equal to the threshold time period, as is depicted with step 312, a second program is initiated. At this point in the method, the first program is initiated which means that in some systems, the user is logged into the system. The second program may initiate additional functionality within the computer system 110. Some examples of second programs may include accessing patient records, requesting medicinal doses, determining health of a battery, or initiating a battery swap.

In one embodiment of the method of FIG. 3, a user in the medical field who can use the NFC tag to access a computing system and then access additional medical related computer programs. Another embodiment for the method of FIG. 3 may include in a retail space, where a sales associate can log into a point of sale (POS) computer system with their NFC tag and then either access price check or check out programming based on the length of the NFC communication time.

Figure 4:
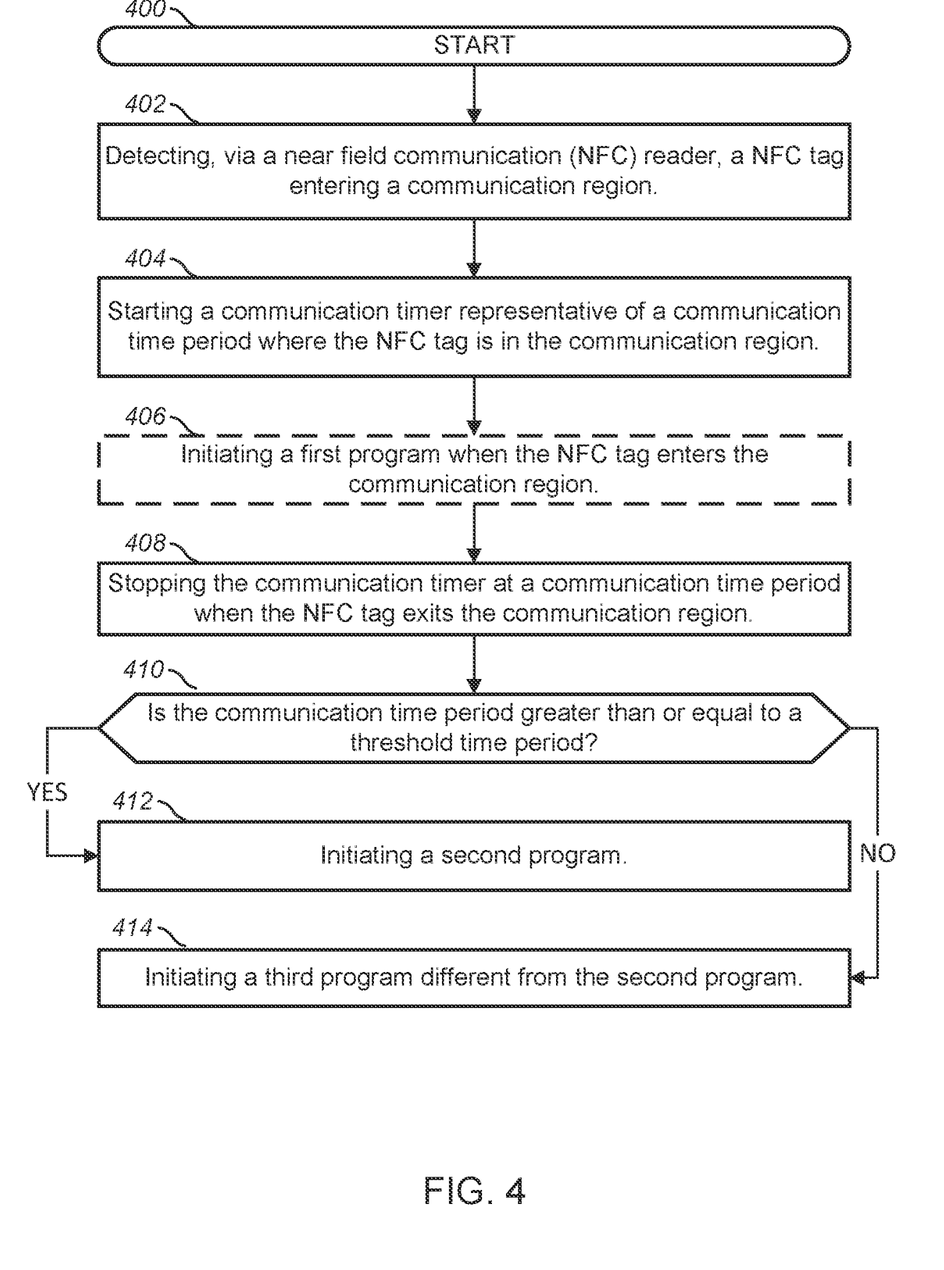
FIG. 4 is another flowchart of an example process using the example system of FIG. 1.

FIG. 4 depicts a method to be accomplished on an embodiment as depicted in FIG. 1.

As illustrated in FIG. 4, step 402 includes sensing, via a NFC reader, a NFC tag entering a communication region. With regards to the embodiment illustrated in FIG. 1, step 402 represents the NFC tag 122 approaching the communication region 124 of the NFC reader 120.

As illustrated in FIG. 4, step 404 includes starting a communication timer representative of a communication time period that the NFC tag is in the communication region. With regards to the embodiment illustrated in FIG. 1 and FIG. 2, step 404 represents starting a communication timer 204 when the NFC tag 122 enters the communication region 124.

As illustrated in FIG. 4, step 406 includes initiating a first program when the NFC tag enters the communication region. As noted by the dotted lines around box 406, in some embodiments step 406 may be an optional step. With regards to the embodiment illustrated in FIG. 1 and FIG. 2, step 406 represents a first program starting when the NFC tag 122 approaches the communication region 124. In the illustrated embodiment, the NFC reader 120 determines that the NFC tag 122 is in the communication region and then transmits a signal to the computer system 110. When the computer system 110 receives the signal from the NFC reader 120, the computer system 110 initiates a first program from memory 202. In some embodiments, the first program is a log-in program. In other words, when a user moves the NFC tag 122 approaches the NFC reader 120 and enters the communication region 124, the computer system 110 logs the user into the computer system 110. As was described above, the NFC tag 122 contains data relating to the user 104 and the computer system 110 is able to recognize the user 104 of the NFC tag 122. In some embodiments, the first program initiated by the computer system 110 is personalized to the user 104. In some embodiments, the first program is optional and the first program does not initiate when the NFC tag 122 and the NFC reader 120 initiate communication. In this embodiment, the first program does not initiate and the second program initiates when the communication time period is greater than the threshold time period.

As illustrated in FIG. 4, step 408 includes stopping the communication timer at a communication time period when the NFC tag exits the communication region. In other words, as illustrated in FIGS. 1 and 2, when the user 104 moves the NFC tag 122 out of the communication region 124, a communication time period is recorded representative of the amount of time where the user 104 had the NFC tag 122 within the communication region 124. The communication time period may be a shorter time, representative of the user 104 doing a quick tapping motion with the NFC tag 122, or a longer time, representative of the user 104 holding the NFC tag 122 against the NFC reader 120. In the illustrated embodiment, the communication time period is saved in the memory of the computer system 110, however the communication time period may also be saved in a network 114, where the network 114 may comprise a server or cloud location.

As illustrated in FIG. 4, step 410 includes determining if the communication time period is greater than or equal to a threshold time period. In the illustrated embodiment, the threshold time period is saved in the memory of the computer system and the processor 200 compares the threshold time period with the communication time period. In the illustrated embodiment, the processor 200 then takes a further action based upon if the communication time period is greater or lesser than the threshold time period, which will be described in further detail below.

As illustrated in FIG. 4, in response to step 410, in response to the communication time being less than the threshold time, as is depicted with step 412, a second program is initiated. As illustrated in FIG. 4, and as used in the embodiment illustrated in FIGS. 1 and 2, the second program is stored in the memory and accessible by the processor 200. The second program is typically different from the first program as the first program is already initiated before the second program is initiated. In the example of FIG. 1, the user 104 of embodiment illustrated in FIG. 1 is a medical professional who uses their ID badge to log-in to the computer system 110 during log-in process.

As illustrated in FIG. 4, in response to step 410 wherein the communication time is greater than the threshold time, as depicted in step 414, a third program is initiated, where the third program is different than the second program. In other words, when the NFC tag 122 is held to the NFC reader 120 for a time longer than the threshold time, a third program is initiated. Whereas if the communication time was under the threshold time and the second program initiated, step 414 initiates the third program. In some embodiments, where step 406 is not in use, a system is already available when approached by a user and the communication time period can be used to determine a quick way to access a program. In one embodiment, a medical user may initiate a program that accesses patient records or may initiate a program that orders a dosage of medicine.

In one embodiment, if a medical professional were to hold an NFC tag 122 to the NFC reader 120 and stopped the communication time before the threshold time, the computing system 110 would display the patient data (example second program), but if the medical user stopped the communication time after the threshold time, the computing system 110 would request medication for a patient.

In another embodiment, the computing system 110 is located in a retail environment. The retail user applies their NFC tag 122 to the NFC reader 120, causing a log-in program to initiate and allow the retail user to access the computing system. In this embodiment, if the retail user removes the NFC tag 122 before the threshold time, the computing system 110 may initiate a price check program. Wherein if the retail user removes the NFC tag 122 after the threshold time, the computing system 110 may initiate an inventory search program, or possibly a check-out program.

In some embodiments, if the communication time is much greater than the threshold time, this may be because a user inadvertently left the NFC tag 122 on the NFC reader 120 longer than intended. In this embodiment, the computing system 110 may send an alert to the user either through the display of the computing system or via the mobile computing device 108.

Figure 5:
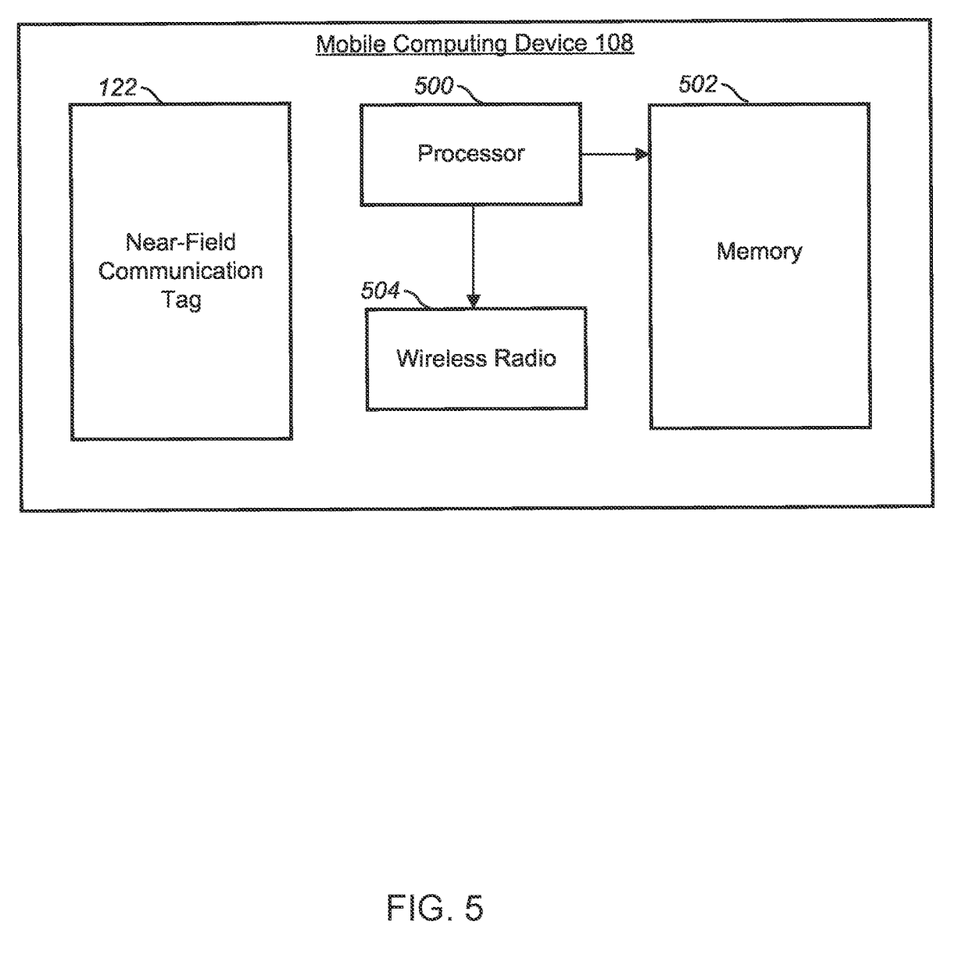
FIG. 5 is a component view of the mobile computing device from FIG. 1.

FIG. 5 depicts internal components of the mobile computing device 108 as illustrated in FIG. 1. The mobile computing device 108 includes a central processing unit (CPU), also referred to as a processor 500, interconnected with a non-transitory computer readable storage medium, such as a memory 502. The memory 502 includes any suitable combination of volatile (e.g., Random Access Memory (RAM)) and non-volatile (e.g. read only memory (ROM), Electrically Erasable Programmable Read Only Memory (EEPROM), flash) memory. The processor 500 and the memory 502 each comprise one or more integrated circuits (ICs).

The mobile computing device 108 also includes a wireless radio 504, enabling the mobile computing device 108 to exchange data with other computing devices, such as the computing system 110 or the network 114. The wireless radio 504 therefore includes any suitable hardware (e.g., antenna, transmitters, receivers, network interface controllers and the like) allowing the mobile computing device 108 to communicate.

The components of the mobile computing device 108 are interconnected by communication buses, and powered by a battery or other power source, over the above-mentioned communication buses or by distinct power buses. In other examples, the processor 500 is implemented as one or more specifically configured hardware elements, such as field-programmable gate arrays (FPGAs) and/or application-specific integrated circuits (ASICs).

The mobile computing device 108 of FIG. 5 further includes an NFC tag 122. The NFC tag 122 is further described above. The NFC tag 122 as depicted in FIG. 1 and FIG. 5 includes a circuit and an antenna. The NFC tag 122 as depicted in FIG. 5 is not interconnected with the processor 500. In other embodiments, the NFC tag 122 is interconnected with the processor 500 and other internal components of the mobile computing device 108.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software. As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, or the like) on which machine-readable instructions (e.g., code in the form of, for example, software and/or firmware) can be stored. The instructions may be stored for any suitable duration of time, such as permanently, for an extended period of time (e.g., while a program associated with the instructions is executing), or for a short period of time (e.g., while the instructions are cached, during a buffering process, or the like). Further, as used herein, each of the terms "tangible machine-readable medium," "non-transitory machine-readable medium" and "machine-readable storage device" is expressly defined to exclude propagating signals. That is, as used in any claim herein, a "tangible machine-readable medium," a "non-transitory machine-readable medium," and a "machine-readable storage device," or the like, should not be interpreted as being implemented as a propagating signal.

As used herein, satisfying a threshold may, depending on the context, refer to a value being greater than the threshold, greater than or equal to the threshold, less than the threshold, less than or equal to the threshold, equal to the threshold, not equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In other embodiments, the above described functionality is not limited to NFC and is generally applicable to short range wireless communication standards. These standards include, but are not limited to Radio Frequency Identification (RFID), High Frequency RFID, or Bluetooth low energy.

What is claimed is:

1. A method for initiating an action with a computer system, the method comprising:
    in response to initiating communication between a tag and a reader, initiating a first program, the first program configured to log into the computer system;
    determining a communication time period by starting a timer when the tag and the reader are within a communication range and stopping the timer when the tag and the reader are no longer within the communication range;
    comparing the timer to a first threshold time period; and
    when the timer is greater than the first threshold time period, initiating a second program, the second program configured to access patient records.

2. The method of claim 1, wherein the tag is a near field communication (NFC) tag, and the reader is a NFC reader.

3. The method of claim 1, wherein the first threshold time period is saved in the tag.

4. The method of claim 1, wherein the first threshold time period is predetermined and saved in memory of the computer system.

5. The method of claim 1, wherein the second program is a program executing a further function selected from the group consisting of ordering medicine, initiating a testing procedure, and printing a test result.

6. The method of claim 1, further comprising, when the timer is over a second threshold, initiating a third program.

7. A system comprising:
    a reader; and
    a memory and a processor, wherein the processor is configured to:
        detect, via a reader, a tag entering a communication region;
        start a communication timer representative of a communication time period corresponding to when the tag is in the communication region;
        initiate a first program when the tag enters the communication region, the first program configured to log into the computer system;
        stop the communication timer when the tag exits the communication region;
        compare the timer to a threshold time period;
        when the timer is greater than or equal to the threshold time period, initiate a second program, the second program configured to access patient records.

8. The system of claim 7, wherein the second program executes a further function of initiating a diagnostic device.

9. The system of claim 7, wherein the second program initiates a change in a medical operation.

10. A tangible computer readable medium having stored thereon computer executable instructions, the instructions comprising:

in response to initiating communication between a tag and a reader, initiating a first program, the first program configured to log into the computer system;

determining a communication time period by starting a timer when the tag and the reader are within a communication range and stopping the timer when the tag and the reader are no longer within the communication range;

comparing the timer to a first threshold time period; and when the timer is greater than the first threshold time period, initiating a second program, the second program configured to access patient records.

11. The computer readable medium of claim 10, wherein the first threshold time period is between 1-3 seconds.

12. The computer readable medium of claim 10, wherein the first program executes logging into the computer system.

13. The computer readable medium of claim 10, the instructions further comprising when the timer is over a second threshold time period, initiating a third program.

* * * * *